United States Patent [19]

Sakaguchi et al.

[11] 4,396,316
[45] Aug. 2, 1983

[54] DIE-HEAD OF MACHINE TOOLS

[75] Inventors: Ryo Sakaguchi; Yoshiharu Ikenaka, both of Higashiosaka, Japan

[73] Assignee: Rex Industries Co., Ltd., Osaka, Japan

[21] Appl. No.: 275,783

[22] Filed: Jun. 22, 1981

[30] Foreign Application Priority Data

Jul. 2, 1980 [JP] Japan .................................. 55/89192

[51] Int. Cl.³ .............................................. B23G 5/12
[52] U.S. Cl. .................................... 408/15; 10/96 R; 10/120; 408/149; 408/177
[58] Field of Search ................ 10/87, 94, 96 R, 96 T, 10/120, 120.5 R, 120.5 AD, 121; 408/12, 15, 73, 148, 149, 176, 177, 219, 221

[56] References Cited

U.S. PATENT DOCUMENTS

| 731,121 | 6/1903 | Nuttall | 408/177 X |
| 1,701,846 | 2/1929 | Harrison | 10/96 R |
| 2,549,543 | 4/1951 | Strickland | 408/148 X |
| 3,580,690 | 5/1971 | McClure | 408/178 |
| 3,648,313 | 3/1972 | Fohl | 10/96 R |
| 3,681,802 | 8/1972 | Youtz et al. | 10/96 R |
| 3,820,180 | 6/1974 | Birkestrand et al. | 408/149 X |
| 3,977,032 | 8/1976 | Newell et al. | 408/148 X |
| 4,288,181 | 9/1981 | Sakaguchi et al. | 408/15 |
| 4,329,093 | 5/1982 | Maruyama | 408/15 |

Primary Examiner—Ervin M. Combs
Attorney, Agent, or Firm—Merchant, Gould, Smith, Edell, Welter & Schmidt

[57] ABSTRACT

A die-head of a cutting machine having a pair of relatively rotatable annular plates which retractably hold therebetween cutting tools extending in radial directions, one of the plates being provided with a tool retracting lever which is pivotably mounted thereto and which is directly engaged by a projection provided on the other plate, the lever being pivotally moved by a workpiece which extends axially in the plates.

2 Claims, 3 Drawing Figures

DIE-HEAD OF MACHINE TOOLS

This invention relates to a machine tool and, in particular, to a die-head thereof having an automatic tool retracting device for automatically retracting cutting tools back to their non-operating positions when the cutting operation is completed.

In conventional known machine tools or cutting machines, such as a pipe cutter, an operator usually operates a die-head manually to withdraw the cutting tools provided on the die-head back to their non-operating positions when the cutting operation is completed. However, in such a case, the operator must always stand by the machine to oversee the completion of the cutting. Furthermore, since it is very difficult for an ordinary operator to cut a uniform length of threads on the pipes, a very highly skilled operator is required.

Attempts have been made by the assignee to whom the present application is assigned to provide die-heads having automatic tool retracting levers for automatically retracting the cutting tools at the completion of the cutting operation (e.g. Japanese Patent Laid Open No. 54-146099 (U.S. Ser. No. 36,809), or Japanese Utility Model Laid Open No. 55-134136 (U.S. Ser. No. 122,459)).

The present invention is also directed to this kind of die-head which has a tool retracting lever.

The object of the invention is to provide a simple die-head of a cutting machine which can automatically and easily retract the cutting tools back to their non-operating positions when the desired cutting is completed.

The invention will be discussed below with reference to the accompanying drawings illustrating preferred embodiments of the invention, in which.

Figure 1:
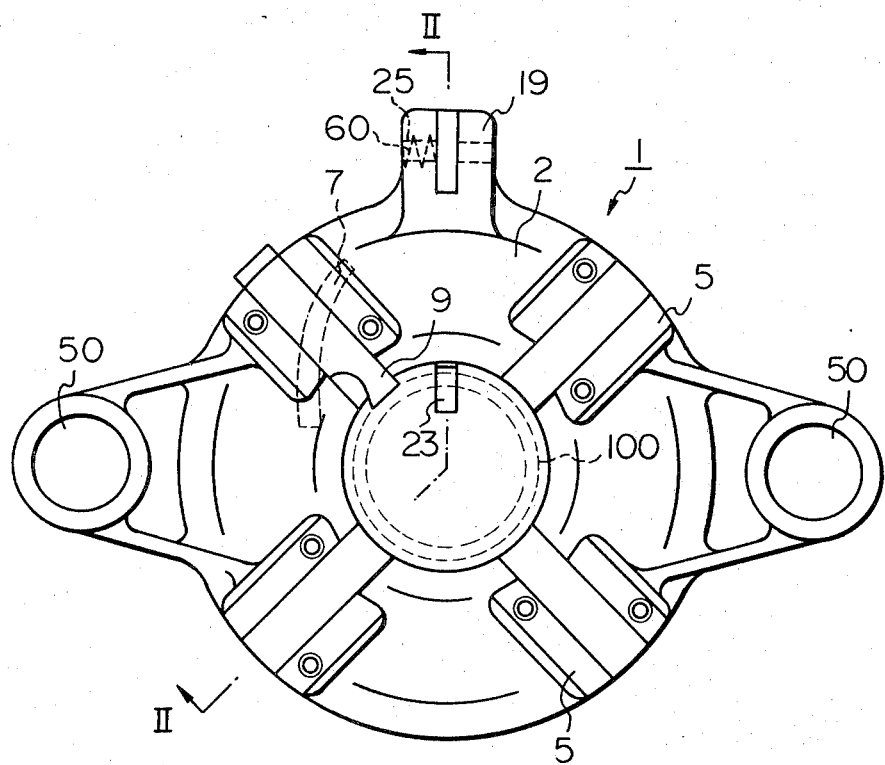
FIG. 1 is an elevational view of a die-head having an automatic tool retracting device, according to the present invention.
Figure 2:
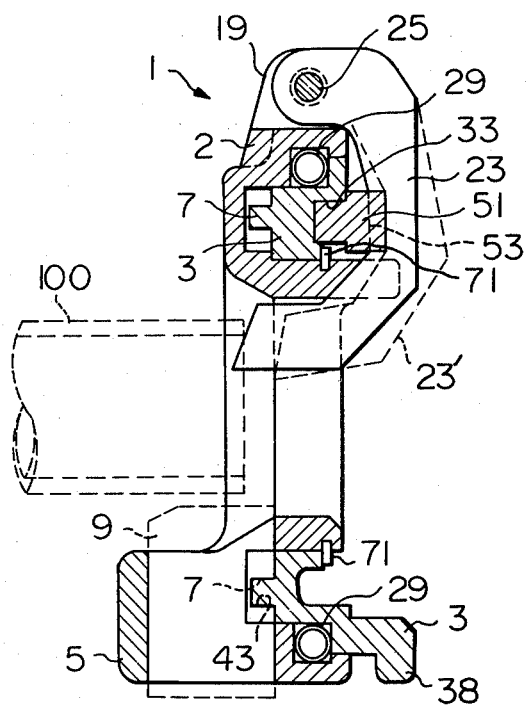
FIG. 2 is a sectional view taken along the line II—II in FIG. 1, showing the operation of a tool retracting lever; and, FIG. 3 is a back view of FIG. 1.
Figure 3:
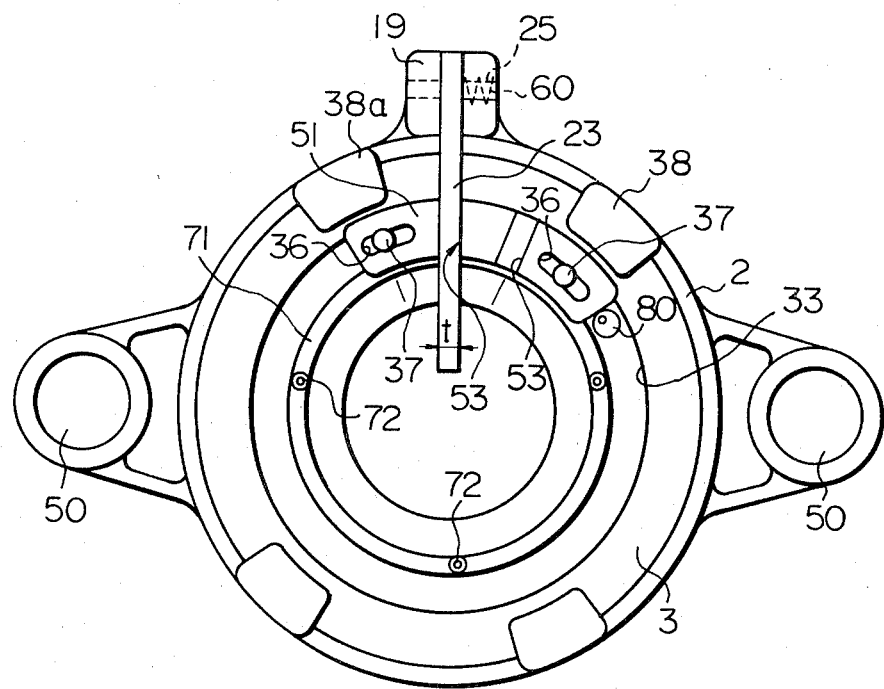

In FIGS. 1, 2 and 3 which illustrate a die-head for supporting cutting tools 9, such as biting tools or chasers (only one of which is illustrated in FIG. 1) extending in radial directions, a die-head body 1 is supported on a carriage (not shown) of a cutting machine (not shown). The carriage is supported by and reciprocally moves along a pair of guide bars (not shown) which extend parallel to a workpiece 100 such as a pipe to be cut. The guide bars can be inserted in mounting holes 50 formed in the body 1.

The die-head 1 has a pair of substantially opposing annular plates 2 and 3 which are rotatable relative to one another. One of the plates 2 and 3, e.g., the movable plate 3, has curved projections 7, the number of projections being equal to that of the cutting tools 9 (wherein the number of projections is four as shown in the illustrated embodiment), and the other stationary plate 2 includes the cutting tools 9 each having a curved groove 43 (FIG. 2) corresponding to each of the curved projections 7. The cutting tools 9 are supported in supporting portions 5 which project outwardly from the outer surface of the plate 2. The cutting tools 9 can be radially displaced due to the engagement of the curved projections 7 and the corresponding curved grooves 43 when a relative rotation occurs between the two plates 2 and 3. Since the scroll mechanism used for radially displacing the above-mentioned cutting tools is well known in the conventional cutting machine, no additional explanation for the mechanism is accordingly given herein.

The radial position of the cutting tools 9 can be set at a desired position by the rotation of the plate 3 relative to the plate 2.

The plate 2 has a holding portion 19 which projects out from the periphery of the plate 2 and which has a tool retracting lever 23 which is pivotally connected to the holding portion by means of a pivot pin 25, so that the lever 23 can rotate about the pivot pin 25. A return spring 60 is provided on the pivot shaft 25 between the lever 23 and the holding portion 19 to bias the lever 23 always in the clockwise direction of FIG. 2 so that the lever 23 is brought into the initial position shown by the solid line in FIG. 2. Between the plates 2 and 3 is arranged a spring 29 (FIG. 2) which gives a peripheral spring force to the plates 2 and 3 so that the plates 2 and 3 tend to rotate relative to each other.

The plate 3 is rotatably held by an inner ring plate 71 which is secured to the plate 2 by means of screws 72. That is, the plate 3 can rotate between the plate 2 and the ring plate 71.

The plate 3 has a projection 51 which is located opposite the lever 23. The projection 51 may be integral with the plate 3 but is preferably a part separate from the plate 3 so that the separate projection 51 is fitted in a corresponding recess 33. Preferably, the projection 51 has elongated slots 36 through which set screws 37 extend to immovably secure the projection 51 to the plate 3, so that a relative angular position between the projection 51 and the plate 3 can be slightly adjusted by loosening the set screws 37. After the radial position of the cutting tools 9 is adjusted by relatively rotating the two plates 2 and 3, in accordance with the diameter of the workpiece (pipe) 100, the projection 51 which has come off from its initial position with respect to the lever 23 is finely adjusted by loosening the set screws 37 so that the projection 51 can be brought into its initial position (predetermined position) opposite the lever 23. Preferably, there is provided an eccentric pin 80 on the plate 3, which bears against one end of the projection 51, so that the rotation of the eccentric pin 80 causes the projection 51 to be peripherally displaced, thus resulting in a fine adjustment of the projection 51.

The projection 51 is provided with at least one but preferably a plurality of U-shaped channels 53 which have a width equal to the thickness t of the lever 23. When the lever 23 is directly fitted in one of the channels 53, the lever 23 becomes integral with the projection 51, so that the relative rotation of the two plates 2 and 3 does not occur even under the influence of the spring 29.

The free end of the lever 23 protrudes into the center opening of the annular plates 2 and 3 so as to be in contact with the pipe 100.

When the cutting operation approaches completion, the front end of the pipe 100 is brought into contact with the free end of the lever 23 and begins to gradually push the lever 23 to the right in FIG. 2, so that the lever 23 is caused to rotate about the pivot pin 25 in a counterclockwise direction in FIG. 2. By the rotation of the lever 23, the lever 23 is disengaged from the groove 53 of the projection 51, as shown at 23' designated by a phantom line in FIG. 2.

When the lever 23 is disengaged from the groove 53, the plate 3 is rotated relative to the plate 2 by the spring force of the spring 29 and the cutting torque which produces during the cutting operation. As a result, the cutting tools 9 are retracted, thus resulting in the completion of machining the pipe 100. Projections 38 and 38a which are provided on the plate 3 serve as knobs which can be grasped by an operator when the two plates 2 and 3 are relatively rotated to set a relative angular position between the plates. The projection 38a serves also as a stop which limits the rapid relative rotation of the two plates 2 and 3 at the completion of the machining operation. That is, when the lever 23 comes into contact with the stop 38a, the rotaion of the plate 2 relative to the plate 3 is stopped, thus resulting in the prevention of the tools 9 from coming out or separating from the corresponding scroll projections 7 even at the completion of machining the workpiece.

As can be understood from the above discussion, according to the present invention, the cutting tools can be rapidly and automatically retracted to their non-working position by means of a simple tool retracting lever mechanism.

The workpiece to be cut is not limited to a pipe and may be of any kind of rod or bar material.

The cutting is not limited to a threading, but includes various kinds of machining, such as taper thread cutting or chamfering.

According to the invention, the length of the thread to be cut on the workpiece is substantially uniform, without requiring a skilled operator, unlike the prior art cutting machine.

We claim:

1. A die-head of a cutting machine comprising a pair of relatively rotatable annular plates each having a center opening into which a workpiece to be cut extends, which movably hold cutting tools therebetween so that said cutting tools can be radially displaced by the relative rotation of said annular plates, said die-head including a tool retracting lever which is at its one end, pivotally connected to one of said annular plates by means of a return spring and which projects, at its other end, in said center opening of said annular plates, a projection which is provided on the other plate, said projection including means for axially and directly engaging said tool retracting lever, and means for biasing said annular plates in peripherally opposed directions thereof by a spring arranged between said annular plates, whereby when said tool retracting lever is pushed and pivoted by said workpiece which axially moves in said opening of said annular plates, said lever is disengaged from said projection, thus resulting in a relative rotation of said annular plates to retract said cutting tools.

2. A die-head of a cutting machine comprising a pair of relatively rotatable annular plates each having a center opening into which a workpiece to be cut extends, which movably hold cutting tools therebetween so that said cutting tools can be radially displaced by the relative rotation of said annular plates, said die-head including a tool retracting lever which is at its one end, pivotally connected to one of said annular plates by means of a return spring and which projects, at its other end, in said center opening of said annular plates, a projection which is provided on the other plate and which can be axially and directly engaged by said tool retracting lever, and means for biasing said two plates in peripherally opposed directions thereof by a spring arranged between said annular plates, said projection being provided with a recessed groove into which is engaged said tool retracting lever, whereby when said tool retracting lever is pushed and pivoted by said workpiece which axially moves in said opening of said annular plates, said lever is disengaged from said projection, thus resulting in a relative rotation of said annular plates to retract said cutting tools.

* * * * *